United States Patent
Nakagawa (10) Patent No.: US 7,562,684 B2
(45) Date of Patent: Jul. 21, 2009

(54) MOTORCYCLE RADIAL TIRE WITH SPECIFIED STEEL BELT CORD

(75) Inventor: Sumito Nakagawa, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 382 days.

(21) Appl. No.: 11/176,297

(22) Filed: Jul. 8, 2005

(65) Prior Publication Data

US 2005/0241741 A1 Nov. 3, 2005

Related U.S. Application Data

(62) Division of application No. 10/031,406, filed as application No. PCT/JP00/08134 on Nov. 17, 2000, now abandoned.

(30) Foreign Application Priority Data

| May 22, 2000 | (JP) | ............................. 2000-149694 |
| Jul. 11, 2000 | (JP) | ............................. 2000-209962 |

(51) Int. Cl.
| B60C 1/00 | (2006.01) |
| B60C 3/04 | (2006.01) |
| B60C 9/22 | (2006.01) |
| B60C 9/20 | (2006.01) |
| B60C 9/18 | (2006.01) |
| B60C 9/08 | (2006.01) |
| B60C 9/04 | (2006.01) |
| B60C 9/00 | (2006.01) |
| D07B 1/06 | (2006.01) |

(52) U.S. Cl. .......................... 152/454; 57/200; 57/236; 57/311; 57/902; 152/451; 152/527; 152/531; 152/532; 152/533; 152/537; 152/556

(58) Field of Classification Search .................. 152/454, 152/527, 531–533, 537, 451, 556; 57/902, 57/200, 236, 311, 9
See application file for complete search history.

(56) References Cited

U.S. PATENT DOCUMENTS

| 3,902,542 | A | * | 9/1975 | Imamura et al. ............ 152/527 |
| 5,285,623 | A | * | 2/1994 | Baillievier et al. ...... 152/527 X |
| 5,562,792 | A | * | 10/1996 | Caretta .................... 152/533 X |
| 5,707,467 | A | | 1/1998 | Matsumaru et al. |
| 5,722,226 | A | | 3/1998 | Matsumaru |
| 5,975,175 | A | * | 11/1999 | Armellin ................. 152/531 X |

FOREIGN PATENT DOCUMENTS

| EP | 0 461 646 A2 | 12/1991 |
| EP | 0 916 521 A2 | 5/1999 |
| JP | 04-232035 A | 8/1992 |
| JP | 04-362402 A | 12/1992 |
| JP | 9-13289 A | 1/1997 |
| JP | 9-67784 A | 3/1997 |
| JP | 0 790 349 A1 | 8/1997 |
| JP | 9-228274 A | 9/1997 |
| WO | WO-99/28547 A1 * | 6/1999 |

* cited by examiner

Primary Examiner—Adrienne C Johnstone
(74) Attorney, Agent, or Firm—Sughrue Mion, PLLC (57) ABSTRACT

The durability is improved by using as a carcass ply cord or a belt cord of a tire a cord formed by twisting plural steel filaments having a tensile strength of not less than 2700 N/mm², and a total elongation at break of the cord of 3.0-7.0% without sacrificing the excellent ride comfort.

10 Claims, 5 Drawing Sheets

MOTORCYCLE RADIAL TIRE WITH SPECIFIED STEEL BELT CORD

This is a division of parent application Ser. No. 10/031,406 filed Jan. 18, 2002, now abandoned, which is a National Stage application under 35 U.S.C. §371 based on International Patent Application No. PCT/JP00/08134 filed Nov. 17, 2000. The entire disclosures of the prior applications are considered part of the disclosure of the accompanying divisional application and are hereby incorporated by reference.

TECHNICAL FIELD

This invention relates to a steel cord for the reinforcement of a rubber article having an excellent durability, a rubber-steel cord composite body capable of enjoying merits of such a cord, and a tire particularly improving a durability and a ride comfort by applying such a cord.

BACKGROUND ART

In a pneumatic tire as a typical example of the rubber article, particularly a tire used under a relatively low internal pressure for use in passenger car, light truck or the like, organic fiber cords such as polyester cord, rayon cord, nylon cord and the like are used as a reinforcing member of a carcass forming a skeleton of the tire. Since a moderate ride comfort is particularly required in the passenger car tire, there are adopted organic fiber cords having a low tensile stress (modulus) at a constant elongation.

Since the organic fiber is relatively low in the modulus and such a modulus is lowered through a high temperature treatment in the vulcanization of the tire, there is a disadvantage that it is required to conduct cooling while feeding air into the tire to hold a constant internal pressure or so-called post cure inflation (PCI) just after the completion of the vulcanization step for preventing shrinkage of the cord.

And also, it is required to subject the organic fiber to an adhesion treatment for obtaining an adhesion to rubber, so that there is a problem that the productivity of the tire is poor.

Furthermore, there are problems in the adhesion durability between organic fiber and rubber and the heat resistance of the organic fiber itself under a higher temperature. For example, it is feared to cause peeling in the adhesion between cord and rubber or fusion of the cord due to heat generation accompanied with high-speed running.

In this connection, steel cords are high in the thermal stability and are advantageous in view of the change of modulus and the adhesion durability, so that it is attempted to apply the steel cord as a carcass ply cord in the passenger car tire.

Since the modulus of the steel cord is too high, however, there is a disadvantage that the degradation of the ride comfort can not be avoided in such a type of the tire that the deformation of the sidewall portion is large as in the passenger car tire.

And also, the steel cord is very high in the compression modulus as compared with the organic fiber cord. Therefore, when the steel cord is applied as a carcass ply cord in the passenger car tire used under a relatively low internal pressure, it can not bear to repetitive input of compression strain typified by buckling deformation generated in the cornering at, for example, a large steering angle and hence the breakage of the cord is caused. This is a large obstacle in the application of the steel cord to the carcass ply.

On the other hand, a motorcycle tire is essentially different in the cornering characteristic from a four-wheeled vehicle tire, so that the development of the motorcycle radial tire delayed. That is, the cornering of the motorcycle tire is realized by inclining the tire inward in the cornering to give a camber angle and producing a camber thrust in accordance with the magnitude of the camber angle. On the contrary, the cornering of the four-wheeled vehicle tire is based on a cornering force produced in accordance with the magnitude of a slip angle given to the tire through an operation of a handle without inclining the tire. Therefore, a profile shape of a tread considerably differs between the motorcycle tire and the four-wheeled vehicle tire. In the motorcycle tire, the tread is an arc shape extending between a pair of sidewalls up to positions corresponding to a maximum width of the tire at a widthwise section of the tire and can ensure a ground contact shape of not less than a certain value even at a side end region of the tread as the camber angle increases. In the motorcycle tire having such a tread form, even if the carcass is simply rendered into a radial carcass, the rigidity of the side portion is not ensured, so that the application of the radial structure is delayed as compared with the four-wheeled vehicle tire. Under such a circumstance, various techniques are developed for establishing the radial structure in the motorcycle tire.

For instance, in order to ensure the rigidity of the side portion in the motorcycle tire having a bias structure, a carcass comprised of at least two plies each containing cords arranged at an inclination angle of about 30-40° with respect to an equatorial plane of the tire is applied so as to cross the cords with each other between the plies. In this case, however, the bending rigidity of the tread portion becomes higher, so that a straight-running stability is obstructed.

In order to solve the above problem, JP-B-7-41764 discloses that an excellent straight-running stability is given to the motorcycle tire having a radial structure by constructing a belt with steel cords arranged substantially in parallel to the equatorial plane of the tire. Moreover, the term "straight-running stability" is defined as a convergence to external disorder during the running.

When the steel cords are arranged substantially in parallel to the equatorial plane of the tire, it newly causes a problem that the cords in the belt does not bear to the repetitive inputs of compression strain typified by the bending deformation generated in the tread portion during the running of the tire under loading and finally the breakage of the cord is generated. That is, the conventional steel cord is relatively high in the compression modulus, so that even if the compression strain applied to the cord is small, the buckling is generated in a part of the cord. If compression input is further applied to the cord, the bending deformation is progressed in such a buckled portion to finally cause fatigue breakage.

On the other hand, JP-A-4-232035 discloses that in the motorcycle radial tire having a belt containing steel cords arranged substantially in parallel to the equatorial plane of the tire, steel cord having a total elongation at break of 4-8% is used as a belt cord. And also, Japanese Patent No. 2935481 discloses that the elongation of the belt cord is defined under various loads in the motorcycle radial tire having a belt containing steel cords arranged substantially in parallel to the equatorial plane of the tire.

In these publications, the belt cord is selected from a viewpoint of tire production or as expected for improving the wear resistance of the tread portion. Since the selected cords indicate a high elongation, they are considered to advantageously act for controlling the buckling deformation when compression strain is generated in the steel cord as mentioned above.

However, these cords have a double strand construction obtained by further twisting plural strands each comprised of filaments twisted at a short pitch or subjected to forming, so that the cord production step becomes complicated and the productivity is poor as compared with a cord of a single strand construction completely produced at, for example, one twisting step and hence there is retained a problem in the cost.

Moreover, when the steel cord is applied to the belt, the rigidity is increased, so that the steering stability is improved but vibrations input to the tread portion are hardly absorbed and hence it tends to damage the vibration absorbability.

DISCLOSURE OF THE INVENTION

It is, therefore, an object of the invention to provide steel cords suitable for improving the ride comfort and durability when a steel cord is applied as a carcass ply cord in a tire used under a relatively low internal pressure as well as a rubber-steel cord composite body and a tire capable of enjoying merits of such a steel cord.

And also, it is another object of the invention to propose a manner for improving the durability while simultaneously establishing excellent straight-running stability and vibration absorbability in a motorcycle radial tire comprising a belt comprised of steel cords of a single strand construction.

When the steel cords are used as a carcass ply cord in a passenger car tire, it is required to improve a resistance to compression fatigue in the cord while developing the reduction of modulus for ensuring the ride comfort. In this case, since the side portion of the passenger car tire is relatively thin, it should be considered that the cord diameter can not be made so thick. The inventors have made various studies with respect to a manner satisfying these conditions and found that it is essential to basically improve the fatigue resistance adapted to a compression fatigue mechanism of the steel cord in addition to the reduction of filament diameter and improvement of twisting structure as in the conventional technique and as a result, the invention has been accomplished.

And also, when the steel cord is applied to a belt of a motorcycle radial tire, it is required to improve the durability or resistance to compression fatigue in the cord while ensuring the straight-running stability and vibration absorbability. For this purpose, it has been found that it is essential to basically improve the fatigue resistance adapted to the compression fatigue mechanism of the steel cord in addition to the forming of the filament and improvement of twisting structure as in the conventional technique and as a result, the invention has been accomplished.

Namely, the gist and construction of the invention are shown in the followings 1-26.
1. A steel cord for the reinforcement of a rubber article characterized by twisting a plurality of steel filaments having a tensile strength of not less than 2700 N/mm$^2$ in which a total elongation at break is 3.0-7.0% and a ratio of an outer diameter of the cord to a twisting pitch is not less than 0.07 but not more than 0.15.
2. A steel cord for the reinforcement of a rubber article according to the item 1, wherein the cord has a single strand construction formed by twisting 2 to 7 steel filaments.
3. A steel cord for the reinforcement of a rubber article according to the item 2, wherein when the number of filaments constituting the cord is N and a filament diameter is d(mm), a total sectional area of the filament represented by $N\pi d^2/4$ is not more than 0.35.
4. A steel cord for the reinforcement of a rubber article according to the item 1, wherein a diameter of the steel filament is 0.15-0.25 mm.
5. A rubber-steel cord composite body formed by embedding a steel cord in rubber, characterized in that the steel cord is formed by twisting a plurality of steel filaments having a tensile strength of not less than 2700 N/mm$^2$, and a total elongation at break is 3.0-7.0% and a ratio of an outer diameter of the cord to a twisting pitch is not less than 0.07 but not more than 0.15.
6. A rubber-steel cord composite body according to the item 5, wherein the cord has a single strand construction formed by twisting 2 to 7 steel filaments.
7. A rubber-steel cord composite body according to the item 6, wherein when the number of filaments constituting the cord is N and a filament diameter is d(mm), a total sectional area of the filament represented by $N\pi d^2/4$ is not more than 0.35.
8. A rubber-steel cord composite body according to the item 5, wherein a diameter of the steel filament is 0.15-0.25 mm.
9. A radial tire comprising a carcass of a cord ply(s) toroidally extending between a pair of bead portions, characterized in that the carcass uses a cord comprised of plural steel filaments having a tensile strength of not less than 2700 N/mm$^2$ and a total elongation at break of the cord is 3.0-7.0%.
10. A radial tire according to the item 9, wherein a ratio of outer diameter of the cord to twisting pitch thereof is not less than 0.07 but not more than 0.12.
11. A radial tire according to the item 9, wherein the cord has a single strand construction formed by twisting 2 to 7 steel filaments.
12. A radial tire according to the item 11, wherein when the number of filaments constituting the cord is N and a filament diameter is d(mm), a total sectional area of the filament represented by $N\pi d^2/4$ is not more than 0.35.
13. A radial tire according to the item 9, wherein a diameter of the steel filament is 0.15-0.25 mm.
14. A radial tire according to the item 9, which further comprises a belt comprised of at least two belt layers arranged on an outside of a crown portion of the carcass in a radial direction and at least one belt reinforcing layer arranged on an outside of the belt in the radial direction and formed by helically winding a cord in a circumferential direction of the tire.
15. A motorcycle radial tire comprising a carcass toroidally extending between a pair of bead portions, a tread arranged on an outside of a crown portion of the carcass in a radial direction and a belt arranged between the carcass and the tread and comprised of at least one layer containing rubberized cords arranged substantially in parallel to an equatorial plane of the tire, characterized in that the cord has a single strand construction formed by twisting plural steel filaments having a tensile strength of not less than 2700 N/mm$^2$ and a total elongation at break of the cord is 3.0-7.0%.
16. A motorcycle radial tire according to the item 15, wherein the cord is comprised of 2 to 7 steel filaments.
17. A motorcycle radial tire according to the item 15, wherein a ratio of outer diameter of the cord to twisting pitch thereof is not less than 0.07 but not more than 0.12.
18. A motorcycle radial tire according to the item 15, wherein a diameter of the steel filament is 0.15-0.35 mm.
19. A motorcycle radial tire according to the item 15, wherein when the number of filaments constituting the cord is N and a filament diameter is d(mm), a total sectional area of the filament represented by $N\pi d^2/4$ is not more than 0.35.
20. A motorcycle radial tire according to the item 15, wherein an end count of the cords in the belt is 10-60 cords/50 mm.
21. A motorcycle radial tire according to the item 15, wherein the carcass is comprised of at least one ply containing chemical fiber cords arranged at an inclination angle of 70-90° with respect to an equatorial plane of the tire.

22. A motorcycle radial tire according to the item 15, wherein a curving degree of the tread is 0.15-0.45.
23. A motorcycle radial tire according to the item 15, wherein a rubber composition coating the steel cord for the belt contains 3-7 parts by weight of sulfur and 0.2-1.5 parts by weight of cobalt based on 100 parts by weight of rubber.
24. A motorcycle radial tire according to the item 15, wherein an auxiliary rubber layer containing sulfur and cobalt in amounts by weight based on 100 parts by weight of rubber corresponding to not less than 50% of the amounts of sulfur and cobalt contained in rubber coating the steel cord for the belt, respectively, is arranged in a region adjacent to the outside and/or the inside of the belt in the radial direction.
25. A tire comprising a carcass toroidally extending between a pair of bead portions, a tread arranged on an outside of a crown portion of the carcass in a radial direction, and a reinforcing layer arranged between the carcass and the tread and comprised of rubberized cords arranged at a cord angle of not more than 10° with respect to an equatorial plane of the tire, characterized in that the cord has a single strand construction formed by twisting plural steel filaments having a tensile strength of not less than 2700 N/mm$^2$, and a total elongation at break of the cord is 3.0-7.0%.
26. A tire according to the item 25, wherein the cord is arranged substantially in parallel to the equatorial plane of the tire.

Figure 1:
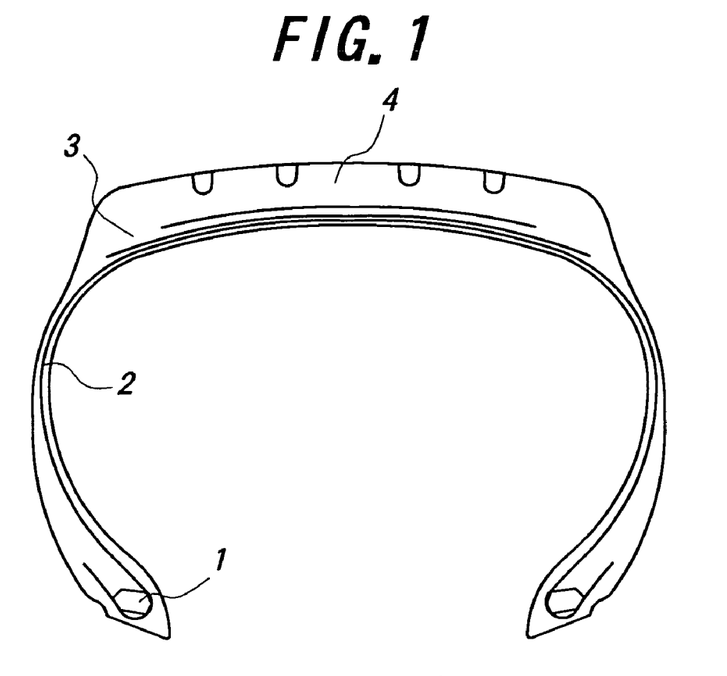
FIG. 1 is a diagrammatic view illustrating an embodiment of the structure in the passenger car tire according to the invention.

In FIG. 1 is shown a pneumatic radial tire for a passenger car as a concrete example of the rubber-steel cord composite body according to the invention. This tire comprises a carcass 2 toroidally extending between a pair of bead portions 1, a belt 3 of at least two layers arranged on an outside of a crown portion of the carcass 2 in a radial direction of the tire, and a tread 4 arranged on an outside of the belt 3 in the radial direction of the tire. The carcass 2 is characterized to be constructed with cords each having a total elongation at break of 3.0-7.0% and formed by twisting plural steel filaments having a tensile strength of not less than 2700 N/mm$^2$.

In order to avoid cord bending and cord breakage through compression deformation applied to the carcass as a problem when the steel cord is applied to the carcass 2, it is effective that the total elongation at break of the steel cord is first regulated to a range of 3.0-7.0%.

In the conventional steel cords, the compression modulus is relatively high, so that buckling deformation is generated in a part of the cord even at a small compression strain of, for example, less than 1% and if compression input is further applied, bending deformation is promoted only in the buckled portion to cause fatigue breakage in the buckled portion. Thus, the buckling is generated in the conventional steel cord during the compression deformation and strain is locally concentrated to bring about the lowering of the fatigue resistance. Therefore, in order to improve the fatigue resistance, it is very effective to avoid the occurrence of the buckling during the compression deformation. For this purpose, the total elongation at break of the steel cord is restricted to not less than 3.0%. That is, when the total elongation at break of the steel cord is not less than 3.0%, if the compression deformation is applied to the cords in the carcass, it is possible to absorb the compression force to previously avoid the occurrence of the buckling and hence the cord bending and the cord breakage are avoided to attain the improvement of the fatigue resistance.

In the steel cord according to the invention, modulus, particularly initial modulus is made lower by restricting the total elongation at break to not less than 3.0% as compared with the conventional steel cord and hence the elongation to a low stress is ensured, so that it is possible to give a moderate flexibility to the carcass of the tire. Therefore, the ride comfort in case of using the steel cord in the carcass is improved by applying the steel cord according to the invention to the carcass.

On the other hand, when the total elongation at break of the steel cord exceeds 7.0%, the change of size in the longitudinal direction of the cord becomes large in a treat member forming the carcass ply and also the curl or warp generated in the treat member becomes large, which degrade the workability in the production of the tire. Therefore, the workability in the production of the tire can be guaranteed by rendering the total elongation at break of the steel cord into not more than 7.0%.

And also, the cord having the total elongation at break of more than 7.0% arouses a problem in its production. That is, it is usual that the production of this type of the cord is carried out by passing each steel filament through a forming apparatus having a plurality of pins arranged zigzag therein prior to the twisting of plural filaments, twisting a plurality of formed filaments, and then passing through a correcting device (straightener) for guaranteeing a quality of the cord, particularly a straightness thereof to obtain a product. In order to produce the cord having the total elongation at break of more than 7.0% at such steps, it is required to make large the distance between mutual pins in the forming apparatus. And also, when tension is released after being passed through the subsequent twisting step, the twisting back phenomenon is caused and hence the stability is lacking as a quality of the resulting cord. Furthermore, when the cord is passed through the correcting device (i.e. the forming is somewhat returned), it is difficult to obtain a desired elongation.

Furthermore, it is important that the tensile strength of the filament constituting the steel cord is not less than 2700 N/mm$^2$. Because, the tensile strength of the filament is required to be at least 2700 N/mm$^2$ for attaining the same tenacity and weight as in a treat member comprised of organic fiber cords.

In the invention, in order to make the total elongation at break of the steel cord as high as not less than 3.0%, it is advantageous that a ratio of an outer diameter of the cord or an outer diameter of the cord at a state of embedding in a rubber article such as a tire to a twisting pitch is made to not less than 0.07 but not more than 0.12. That is, as the ratio of the outer diameter of the cord to the twisting pitch becomes large, an angle of the filament to a loading direction becomes large and hence the total elongation at break rises. Especially, when the ratio of the cord outer diameter to the twisting pitch is not less than 0.07, the occurrence of the buckling deformation of the cord is removed and the fatigue resistance is improved. On the other hand, as the ratio of the cord outer diameter to the twisting pitch becomes too large, the quality and productivity of the cord are degraded and also the effect of improving the aforementioned resistance to compression fatigue is small, so that the ratio of the cord outer diameter to the twisting pitch is desirable to be not more than 0.12.

Moreover, when the cord is applied to the rubber article, particularly when the cord having a large forming quantity is applied under tension, there is a possibility that the outer diameter of the cord in rubber reduces by about 20%. In this case, the ratio of the cord outer diameter to the twisting pitch is sufficient to be not more than 0.15 standardizing the outer diameter of the cord just after the production thereof.

The term "outer diameter of cord" used herein means a diameter when an outer profile of the cord is a circle, and a half value of a sum of major axis and minor axis when the outer profile is an ellipse.

Then, the cord construction is not particularly restricted unless the action of absorbing compression strain applied to the whole of the cord by uniform deformation of each portion of the cord as expected in the invention is not obstructed and can optionally be selected from a single strand construction such as 1×N (N: 2-7) or the like and a layer construction such as 1+N (N: 2-8) or the like. Among them, the single strand construction of 1×N or the like is desirable. That is, the single strand construction can avoid the concentration of stress because all filaments constituting the steel cord have the same helical form and uniformly deform when compression deformation is applied to the cord. Further, the single strand construction can be produced by one twisting step, so that it is possible to largely reduce the cost required for the production of the cord.

Especially, it is favorable that when the number of filaments constituting the cord is N and the filament diameter is d (mm), total sectional area of filaments represented by product $N\pi d^2/4$ of filament number N and filament sectional area $\pi d^2/4$ is not more than 0.35. The total sectional area of filaments $N\pi d^2/4$ is an indication showing a magnitude of a bending rigidity in the steel cord of the single strand construction. Therefore, when $N\pi d^2/4$ exceeds 0.35, the bending rigidity of the cord becomes higher and hence when the cord is used in a treat member applied to the carcass, the operation of folding the treat member in the tire building becomes difficult, while when the cord is used in the tire, there is a possibility that plastic deformation remains in the ply cord due to a large deflection of the side portion of the tire when being used under a low internal pressure during the drag running through puncture.

And also, the diameter of the filament is advantageous to be 0.15-0.25 mm, preferably 0.15-0.18 mm. That is, when the filament diameter is less than 0.15 mm, the drawing in the production of the filament becomes difficult, while when the filament diameter exceeds 0.25 mm, the cord diameter becomes thick and the bending rigidity of the cord is too large and hence there are brought disadvantages such as obstruction of shaping in the treat member and the like.

Incidentally, general steels applied to this type of the steel filament can be used as a raw material of the steel filament. Concretely, there can be used steels widely ranging from usual steel having a tensile strength of about 3000 N/mm$^2$ to super-high strength steel having a tensile strength of about 4200 N/mm$^2$.

Figure 2:
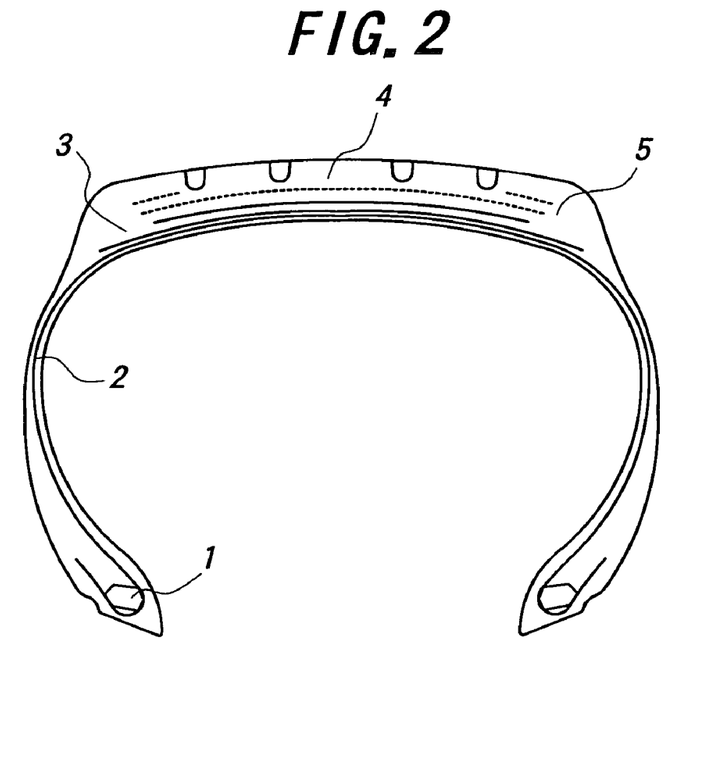
FIG. 2 is a diagrammatic view illustrating another embodiment of the structure in the passenger car tire according to the invention.

In the tire structure shown in FIG. 1 is arranged at least one belt reinforcing layer 5 formed by spirally winding a chemical fiber cord in a circumferential direction of the tire as shown in FIG. 2 over a full width of the belt 3 and/or at both end portions of the belt, whereby the rigidity in the circumferential direction of the tire is increased and the compression input to the carcass ply cord in the cornering of the tire is reduced. Particularly, when plural belt reinforcing layers 5 are used, as shown in FIG. 2, it is favorable to increase the number of the layers at both end portions of the belt than that at the other region thereof.

And also, the steel cord for the reinforcement of the rubber article according to the invention can be applied even to the belt 3 and the belt reinforcing layer 5 likewise the above carcass ply. That is, the steel cord according to the invention is very effective in the application to portions bearing the compression input and requiring a high rigidity based on the steel cord. Particularly, the steel cord according to the invention is advantageously adaptable in the application to the structure fixed at both ends typified by the above carcass ply, the application to an endless belt formed by spirally winding the cord along the equatorial plane of the tire or the like rather than the application to a slant belt mitigating input by the change of cord angle, e.g. by arranging the cords inclined with respect to the equatorial plane of the tire.

Next, the case of applying the steel cord according to the invention to a motorcycle radial tire will be concretely described.

Figure 3:
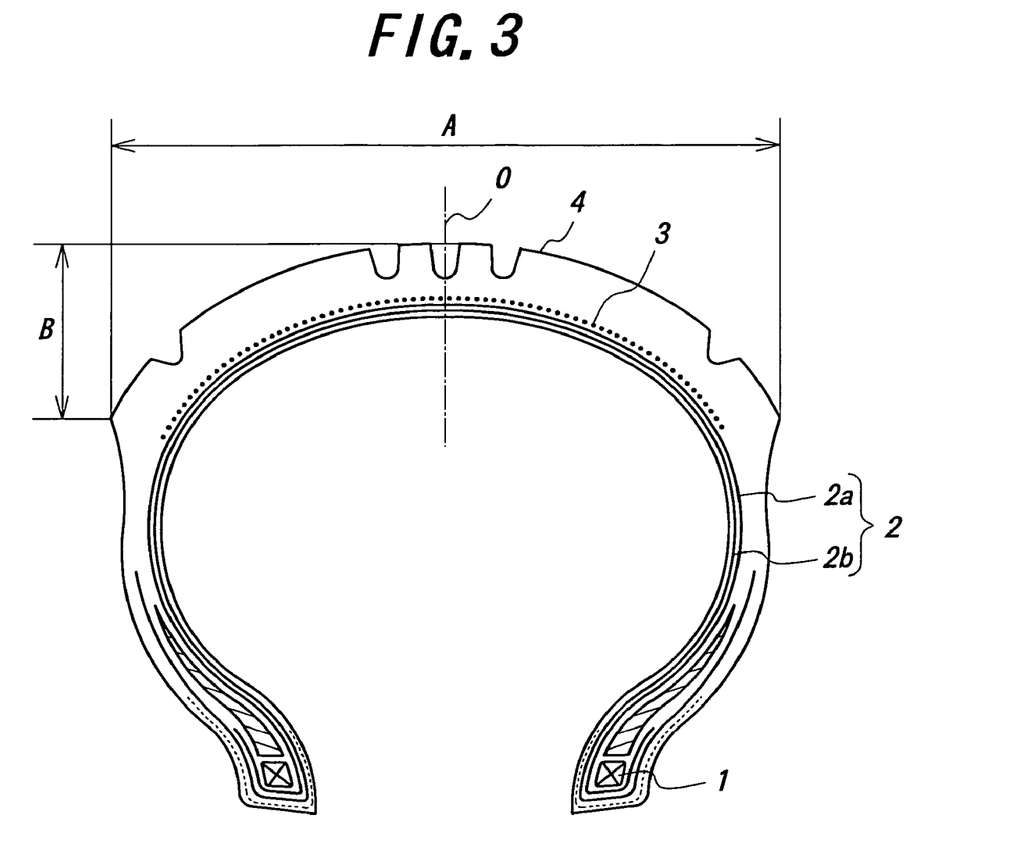
FIG. 3 is a diagrammatic view illustrating an embodiment of the structure in the motorcycle tire according to the invention.

In FIG. 3 is illustrated a pneumatic radial tire for a motorcycle according to the invention.

This tire comprises a carcass 2 toroidally extending between a pair of bead cores 1, a belt arranged on an outside of a crown portion of the carcass 2 in a radial direction of the tire and comprised of at least one layer containing cords arranged along an equatorial plane O of the tire, and a tread 4 arranged on an outside of the belt 3 in the radial direction of the tire. It is characterized by applying a cord having a total elongation at break of 3.0-7.0% and a single strand construction formed by twisting plural steel filaments having a tensile strength of not less than 2700 N/mm$^2$ to the belt 3.

In this case, in order to avoid the cord bending and further cord breakage through compression deformation applied to the belt as a problem when the steel cord is applied to the belt 3 of the motorcycle tire, it is effective to regulate the total elongation at break of the steel cord to a range of 3.0-7.0%.

That is, as previously mentioned, in the conventional steel cord, since the compression modulus is relatively high, the buckling deformation is generated in a part of the cord even at a small compression strain of, for example, less than 1% and if the compression input is further added, the bending deformation is promoted in such a buckled portion to cause the fatigue breakage in the buckled portion. Thus, the buckling is generated in the conventional steel cord at the compression deformation, so that strain is locally concentrated to bring about the lowering of the fatigue resistance. Therefore, in order to improve the fatigue resistance, it is very effective to avoid the occurrence of the buckling in the compression deformation. For this purpose, the total elongation at break of the steel cord is restricted to not less than 3.0%. That is, when the total elongation at break of the steel cord is not less than 3.0%, it is possible to absorb compression force when the compression deformation is applied to the belt and previously avoid the occurrence of the buckling, and hence the cord bending and the cord breakage are avoided to attain the improvement of the fatigue resistance.

And also, in the steel cord according to the invention, the modulus, particularly initial modulus is made lower than that of the conventional steel cord by rendering the total elongation at break of the steel cord into not less than 3.0%, so that the elongation against the low stress is ensured and it is possible to give an adequate flexibility to the belt of the tire. Therefore, the vibration absorbability is improved by applying the steel cord according to the invention to the belt.

On the other hand, when the total elongation at break of the steel cord exceeds 7.0%, the change of the size in the longitudinal direction of the cord is too large in the production of the cord and hence it is difficult to stably produce the tire and there are caused problems in the production of the tire as previously mentioned.

Furthermore, it is important that the tensile strength of the filament constituting the steel cord is not less than 2700 N/mm$^2$. Because, when the tensile strength of the filament is not less than 2700 N/mm$^2$ for giving the strength at break required in the tire, the indispensable total strength required in the tire is obtained without excessively thickening the filament diameter.

As previously mentioned, in order to make the total elongation at break of the steel cord, particularly cord of the single strand construction as high as not less than 3.0%, it is advantageous that a ratio of an outer diameter of the cord or an outer diameter of the cord at a state of embedding in a rubber article such as a tire to a twisting pitch is made to not less than 0.07 but not more than 0.12.

Incidentally, when the outer profile of the cord is a circle, it is sufficient to measure the diameter of the circle as an outer diameter of the cord, but when the outer profile is an ellipse, values of major axis and minor axis are measured at four places on the circumference of the tire and at three positions of each place (center portion, serial side end portion and anti-serial side end portion) and an average value of the measured values is an outer diameter.

Then, the single strand construction of 1×N (N: 2-7) is recommended as a cord construction from a viewpoint of a case that the action of absorbing compression strain applied to the whole of the cord by uniform deformation of each portion of the cord as expected in the invention and the production cost of the cord as previously mentioned.

In case of particularly applying to the belt of the motorcycle tire, when the number of the filaments constituting the cord is N and the filament diameter is d (mm), it is favorable that the total sectional area of the filaments represented by product $N\pi d^2/4$ of the filament number N and the filament sectional area $\pi d^2/4$ is not more than 0.50. Such a total sectional area $N\pi d^2/4$ is an indication showing a magnitude of bending rigidity in the steel cord of the single strand construction. Therefore, when $N\pi d^2/4$ exceeds 0.50, the bending rigidity of the cord becomes high and hence the bending rigidity outside the face of the tread portion is too high, so that the ground contact property is considerably lowered and also the vibration absorbability lowers.

Furthermore, the diameter of the filament is advantageous to be 0.15-0.35 mm, preferably 0.18-0.25 mm when the cord is applied to the belt of the motorcycle tire. That is, when the filament diameter is less than 0.15 mm, the drawing in the production of the filament is difficult, while when the filament diameter exceeds 0.35 mm, the cord diameter becomes thick and the bending rigidity of the cord is too large, so that the ground contact property lowers but also the bending strain on the surface of the filament in the bending deformation becomes large, which are unfavorable in view of the durability.

Incidentally, general steels applied to this type of the steel filament can be used as a raw material of the steel filament. Concretely, there can be used steels widely ranging from usual steel having a tensile strength of about 3000 $N/mm^2$ to super-high strength steel having a tensile strength of about 4200 $N/mm^2$ as previously mentioned.

The above steel cord is preferable to be applied to the belt at an end count of 10-60 cords/50 mm. When the end count is less than 10 cords/50 mm, the rigidity is too low and the steering stability is obstructed, while when it exceeds 60 cords/50 mm, the rigidity is too high and the ground contact property lowers.

The belt may be a member formed by coating many cords arranged in parallel to the equatorial plane of the tire with rubber or a member formed by spirally winding a tape of one or several cords coated with rubber along the equatorial plane of the tire. It is more effective to apply the invention to the latter case. In the latter case, the number of the cords arranged at a section in the widthwise direction of the tire corresponds to the above end count.

As the coating rubber for the steel cord in the belt may be used a rubber composition containing 3-7 parts by weight of sulfur and 0.2-1.5 parts by weight of cobalt based on 100 parts by weight of rubber component for improving the adhesion property between rubber and cord.

Further, it is advantageous that an auxiliary rubber layer containing sulfur and cobalt based on 100 parts by weight of rubber corresponding to not less than 50%, preferably not less than 80% of each amount of sulfur and cobalt included in a coating rubber for steel cord in the belt is arranged in a zone adjacent to the belt outward and/or inward in the radial direction. That is, from a viewpoint of the adhesion property between the cord and the rubber in the belt, it is favorable to arrange the auxiliary rubber layer in the zone adjacent to the coating rubber of the belt outward and/or inward in the radial direction in order to prevent the migration of sulfur and cobalt included in the coating rubber for the belt toward the surrounding of the belt. Moreover, this is important even in a meaning that when the belt is formed by winding a tape of cord(s) coated with rubber along an equatorial plane of the tire, even if a part of the coating rubber for the cord is slaked off, the arrangement of the auxiliary rubber layer outside the coating rubber can prevent the largely lowering of the adhesion to the cord.

On the other hand, the carcass of the motorcycle tire according to the invention is comprised of at least one carcass ply containing chemical fiber cords such as nylon cord, polyester cord, rayon cord, aromatic polyamide cord or the like arranged at a cord inclination angle of 70-90° with respect to the equatorial plane of the tire. Moreover, the embodiment of FIG. 3 shows a carcass 2 comprised of two plies 2a and 2b, wherein a turnup end of the carcass ply 2b wound around the bead core 1 is disposed outward from a turnup end of the carcass ply 2a in the radial direction of the tire.

And also, the tread 4 is advantageous to have a curving degree of 0.15-0.45. The term "curving degree of tread" used herein defines a ratio of difference in radius between a tread end and a center of tread width to the tread width or B/A shown in FIG. 3. When the curving degree is less than 0.15, the tread end prematurely appears and the gripping force is lost, while when it exceeds 0.45, the tire is fallen down over a necessary level and it is difficult to effectively utilize the gripping.

Furthermore, it is possible to assist the improvement of the steering stability (rigid feeling) by arranging at least one belt reinforcing layer containing rubber coated chemical fiber cords such as nylon cord, aromatic polyamide cord or the like arranged preferably at a cord inclination angle of not less than 20° with respect to the equatorial plane at the inside and/or the outside of the belt 3 in the radial direction and over a full width of the belt 3 and/or in both end portions thereof to increase the rigidity in the circumferential direction of the tire.

Moreover, the steel cord according to the invention is very effective to be applied to a portion subjected to compression input and requiring a high rigidity through the steel cord. Particularly, it is very effective to not only the application to the belt of the above motorcycle tire in which the cords are arranged substantially in parallel to the equatorial plane of the tire rather than the application to the slant belt mitigating the input by the change of the cord angle or, for example, by fairly inclining the cords with respect to the equatorial plane of the tire, but also the application to the belt reinforcing layer in various tires in which the cords are arranged at a cord angle of not more than 10° with respect to the equatorial plane, particularly substantially in parallel thereto.

BEST MODE FOR CARRYING OUT THE INVENTION

EXAMPLE 1

With respect to various steel cords prepared under a specification shown in Table 1 are made tensile test and compression test and examined the fatigue resistance. Moreover, the diameter and pitch length of the steel cord are measured by taking out a steel cord just after the production from a spool without applying an extra stress to the cord, taking out a filament from the cord without applying an extra force to the cord, stretching the filament so as to retain the helical forming without applying tension to the filament, and observing an amplitude in the helical form retained in the filament as a cord outer diameter and a pitch of the helical form as a length of a twisting pitch through a magnifying glass, respectively.

In the tensile test, the steel cord just after the production is taken out from the spool without applying an extra stress to the cord and subjected to initial load of 50 g at a gripping distance of 250 mm according to JIS G3510 (1992) and pulled at a pulling rate of 25 mm/min until the cord is broken, during which maximum load requiring the breakage of the cord and elongation are measured to determine load at break and total elongation at break.

In the compression test, the cords to be tested are embedded in a cylindrical rubber sample so as to overlap an axial direction of the cord with an axis of the cylindrical sample and compression is applied in the axial direction of the cord to measure compression strain and compression load.

The resistance to compression fatigue in the cord is evaluated by embedding the cords to be tested in a cylindrical rubber sample so as to overlap an axial direction of the cord with an axis of the cylindrical sample and repeatedly applying a constant compression strain in the axial direction of the cord to measure the number applied until the cord is broken.

The above measured results are shown in Table 1 and FIGS. 4 to 7. In Table 1, cord A is a polyethylene terephthalate (PET) cord as a comparative example, and cords B and C are conventional steel cords having a small filament forming quantity and a small total elongation at break. On the other hand, cords D to F are cords according to the invention in which the total elongation at break is enhanced by making the cord outer diameter large or making the twisting pitch short to make the ratio of cord outer diameter to twisting pitch large.

TABLE 1

|  | Cord A (Comparative Example) | Cord B (Comparative Example) | Cord C (Comparative Example) | Cord D (Example) | Cord E (Example) | Cord F (Example) |
| --- | --- | --- | --- | --- | --- | --- |
| Cord material *1 | polyester [1000D/2] | NT steel close structure | SHT steel open structure | NT steel close structure | SHT steel open structure | SHT steel open structure |
| Construction *2 | — | 1 × 5 × 0.15 | 1 × 5 × 0.15 | 1 × 5 × 0.15 | 1 × 4 × 0.18 | 1 × 5 × 0.18 |
| Pitch length (mm) | — | 8.1 | 8.04 | 8.25 | 8.22 | 6.1 |
| Cord diameter (mm) | — | 0.456 | 0.529 | 0.694 | 0.670 | 0.685 |
| Cord diameter/Pitch length | — | 0.056 | 0.066 | 0.084 | 0.082 | 0.112 |
| Filament *3 Total sectional area (mm$^2$) | — | 0.088 | 0.088 | 0.088 | 0.102 | 0.127 |
| Filament tenacity (N) | 29.5 | 47.1 | 59.9 | 48.3 | 81.1 | 82.5 |
| Tensile strength of filament (N/mm$^2$) | — | 2667 | 3391 | 2735 | 3189 | 3244 |
| Total elongation at break (%) | 13 | 2.2 | 2.8 | 4.2 | 3.9 | 4.4 |
| Occurrence of buckling *4 | absence | presence | presence | absence | absence | absence |

*1 NT = Normal Tensile: usual steel, SHT = Super High Tensile: super-high strength steel
*2 Construction: twisting construction × filament diameter (mm).
*3 Total sectional area of filaments constituting cord.
*4 presence or absence of buckling deformation when the cord is compressed up to a compression strain of 5%.

Figure 4:
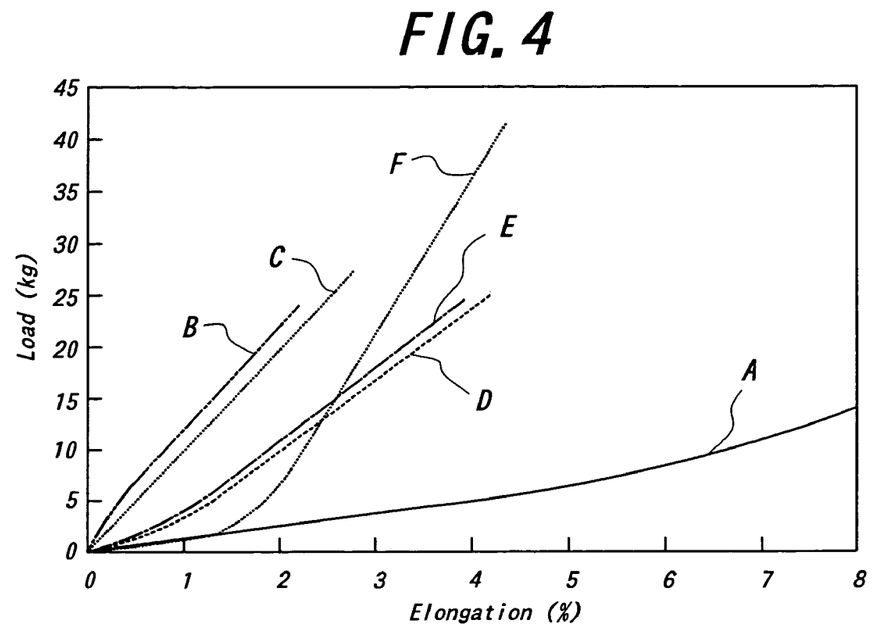
FIG. 4 is a graph showing a relation between tensile load and elongation in a cord.

In FIG. 4 is shown a relation between tensile load and elongation in the cords shown in Table 1. As seen from this figure, the PET cord as the cord A is very large in the elongation and low in the modulus. And also, the cords B and C are very high in the initial modulus and small in the elongation until the breakage of the cord because the cord outer diameter is small and the filaments in the cord substantially contact with each other. On the other hand, each of the cords D, E and F according to the invention is relatively large in the distance between the filaments, so that the initial modulus until the contact between the filaments through the close of the twisting is low and the modulus after the contact between the filaments is increased to substantially the same level as those of the cords B and C and the total elongation at break is larger than that of the conventional steel cord.

Figure 5:
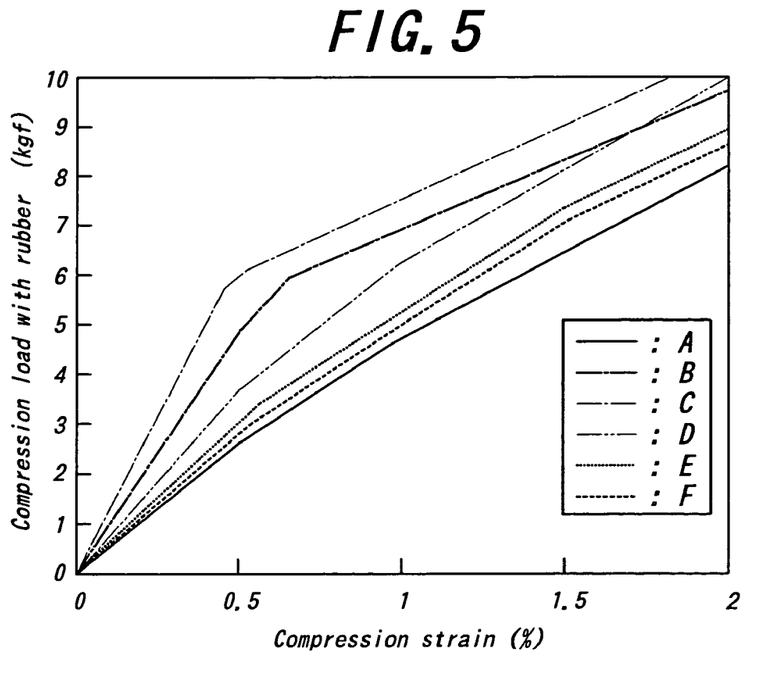
FIG. 5 is a graph showing a relation between compression load and strain in a cord.

Similarly, the relation between compression load and strain in the cords is shown in FIG. 5. As seen from this figure, the PET cord as the cord A is low in the compression modulus and the buckling of the cord is not generated. And also, the cords B and C are small in the ratio of cord outer diameter to twisting pitch and relatively high in the compression modulus at an initial compression and hence the buckling deformation is generated in the cord at a small compression strain of less than about 1%. The strain at the time of the buckling deformation of the cord is called as a buckling point, which appears as an inflection point in the compression load-strain graph, and the compression modulus lowers after the buckling deformation. As the compression is continued even after the occurrence of the buckling point, a large deformation is caused in only the buckling deformed portion. On the contrary, the cords D to F, particularly cords having a large ratio of cord outer diameter to twisting pitch as the cord F are low in the initial compression modulus, and the buckling deformation is not generated even over the buckling point of the conventional cords B and C.

Figure 6:
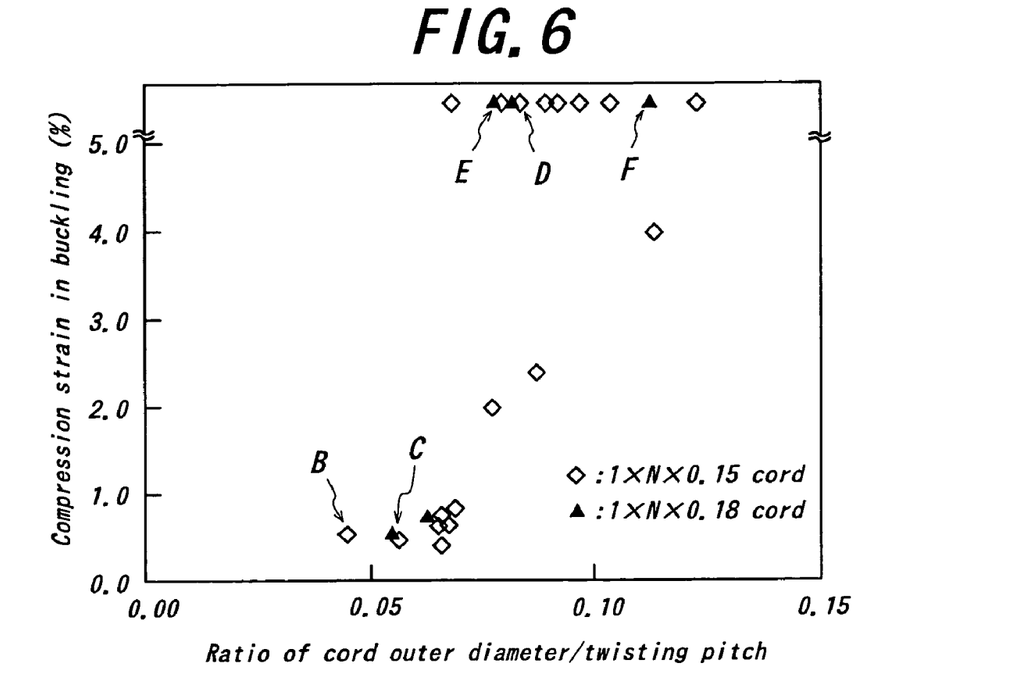
FIG. 6 is a graph showing a relation between cord outer diameter/twisting pitch and compression strain.

In FIG. 6 is shown a relation between ratio of cord outer diameter to twisting pitch in the steel cord and resistance to buckling. As seen from this figure, the buckling is generated at a relatively low compression strain in the cords B and C having a small ratio of cord outer diameter to twisting pitch, while the buckling deformation is not caused in the cords D to F according to the invention having a large ratio of cord outer diameter to twisting pitch and hence the resistance to buckling is largely improved. Moreover, the results measured up to a compression strain of 5% at maximum are shown in FIG. 6, in which the cords shown at a position exceeding 5% in this figure do not generate the buckling even if the compression strain of 5% is applied.

Figure 7:
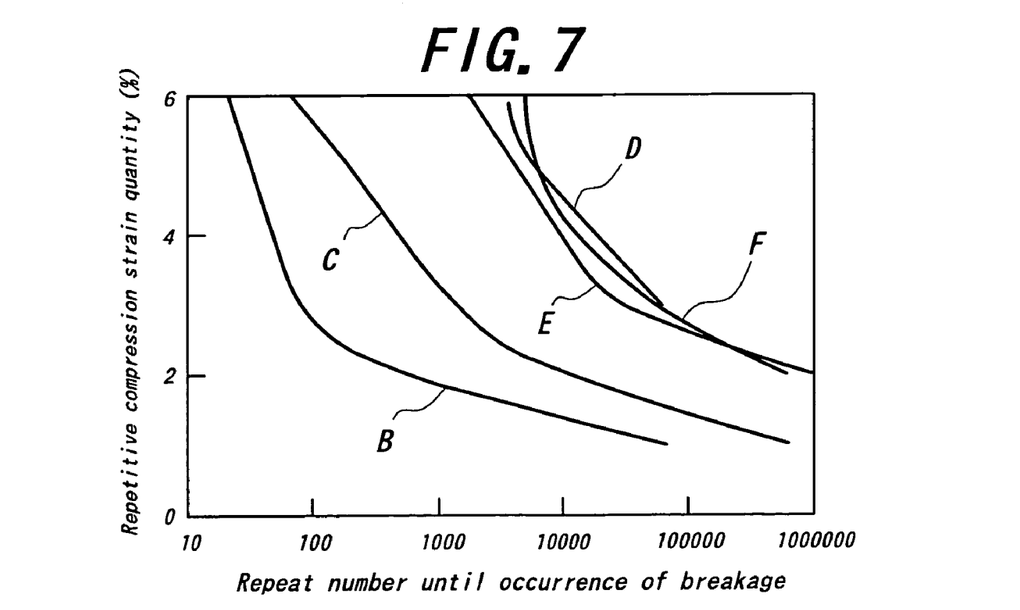
FIG. 7 is a graph showing a fatigue resistance of a cord.

Further, as the compression fatigue property of each steel cord is shown in FIG. 7, in the conventional cords B and C having a small ratio of cord outer diameter to twisting pitch, the buckling deformation is generated at the low compression strain, so that the compression fatigue life is short, while in the cords D to F according to the invention having a large ratio of cord outer diameter to twisting pitch, the buckling deformation is not generated, so that the compression fatigue life becomes relatively long.

Then, each of the cords B, C and F in Table 1 is applied to a carcass 2 in a radial tire for a passenger car having a structure shown in FIG. 2 to prepare a tire having a tire size of 195/65 R14. Moreover, the end count of the steel cord in the carcass is 50 cords/50 mm in the cord B, 40 cords/50 mm in the cord C, and 27.6 cords/50 mm in the cord F, respectively.

Figure 8:
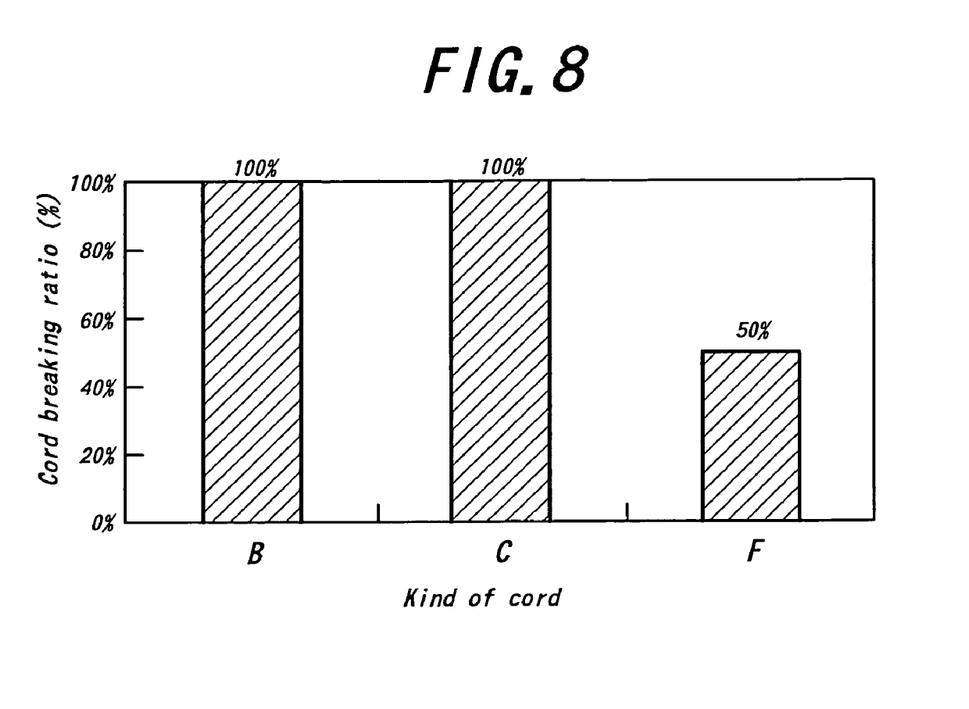
FIG. 8 is a graph showing a durability of a carcass ply cord in a tire.

The thus obtained tire is inflated under an internal pressure of 0.2 N/mm$^2$, assembled into a rim of 6JJ×14, mounted onto a passenger car and actually run on a 8-shaped course at a speed of 25 km/h over a distance of 25 km. Thereafter, the carcass ply is taken out from the tire and the number of the cords broken is measured to determine a cord breaking ratio occupied in the sum of the carcass ply cords. The measured results are shown in FIG. 8, from which it is clear that the cord breaking ratio in the tires using the conventional cords B and C is very high and is approximately 100%, while the cord breaking ratio in the tire using the cord F according to the invention is largely reduced.

EXAMPLE 2

Various cords prepared under a specification shown in Table 2 are applied to a belt 3 in a radial tire for a motorcycle having a structure shown in FIG. 3 to prepare a front-wheeled tire having a tire size of 120/70 ZR17 and a rear-wheeled tire having a tire size of 190/50 ZR17, respectively. Moreover, a carcass is comprised of one ply containing nylon cords (1260 d/2) arranged at a cord angle of 90° with respect to an equatorial plane of the tire.

The thus obtained two tires are assembled into rims of MT3.50 and MT6.00 and inflated under internal pressures of 250 kPa and 290 kPa, respectively, and then mounted onto a motorcycle and actually run to evaluate the straight running stability and vibration absorbability by a feeling of a professional driver. The evaluation is carried out by evaluating points of 1-10, wherein the larger the evaluating point, the better the property.

Figure 9:
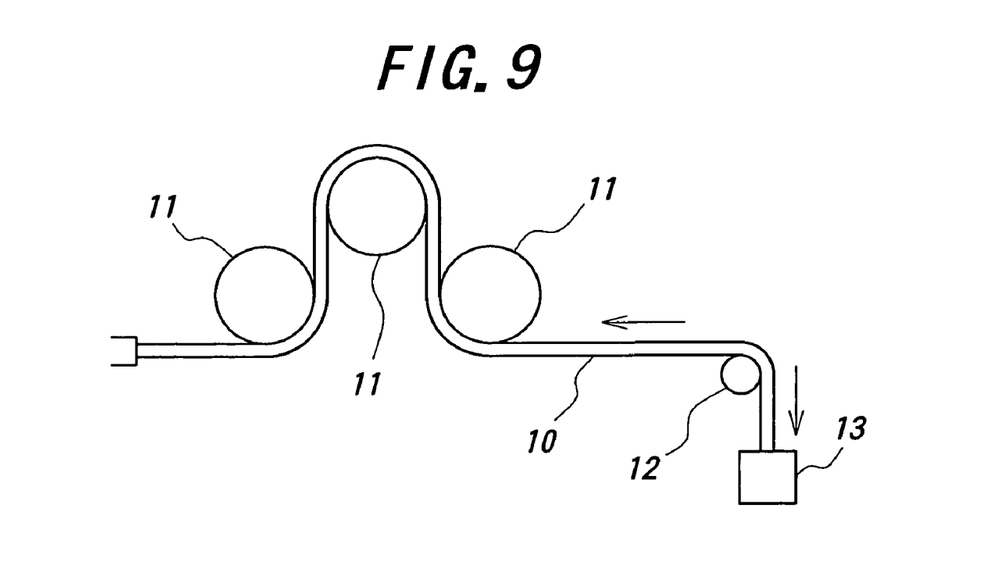
FIG. 9 is a schematic view illustrating a measurement of residual fatigue property of a cord.

And also, the above test tire is mounted onto the motorcycle under the same conditions as mentioned above and actually run over a distance of 30,000 km. Thereafter, the belt is taken out from the tire and the cord coated with rubber is sampled out therefrom to measure the residual fatigue. That is, as shown in FIG. 9, the cord 10 coated with rubber is extended over three pulleys 11 each having a diameter of 40 mm and passed through a small pulley 12 to fix a weight 13 corresponding to a tenth of breaking load of a new cord to a top of the cord. At a state of applying tensile load to the cord, bending strain is repeatedly applied to the cord 10 by moving the cord at a length of 20 cm in front-back directions to measure the repeat number until the occurrence of fatigue breakage of the cord. Such a measurement is carried out with respect to ten cords 10 to determine an average repeat number. The results are represented by an index on the basis that the average repeat number of the tire in Comparative Example 2 is 100, wherein the larger the index value, the better the fatigue resistance of the cord.

The above results are also shown in Table 2.

TABLE 2

|  | Comparative tire 1 | Comparative tire 2 | Invention tire 1 | Invention tire 2 |
|---|---|---|---|---|
| Cord material | aromatic polyamide fiber | steel | steel | steel |
| Construction *1 | 1500 d/2 | 1 × 5 × 0.18 | 1 × 5 × 0.18 | 1 × 5 × 0.21 |
| Twisting pitch length (mm) | 32/32 *2 | 8.0 | 8.0 | 9.0 |
| Cord diameter (mm) | — | 0.50 | 0.72 | 0.98 |
| Cord diameter/Pitch length | — | 0.063 | 0.090 | 0.109 |
| Filament *3 | — | 0.127 | 0.127 | 0.173 |
| Total sectional area (mm$^2$) |  |  |  |  |

TABLE 2-continued

|  | Comparative tire 1 | Comparative tire 2 | Invention tire 1 | Invention tire 2 |
| --- | --- | --- | --- | --- |
| Tensile strength of filament (N/mm$^2$) | — | 3580 | 3580 | 3520 |
| Total elongation at break (%) | 8.0 | 2.4 | 4.0 | 3.5 |
| Cord angle (with respect to equatorial plane) | 0° | 0° | 0° | 0° |
| Straight running stability | 5 | 7 | 7 | 8 |
| Vibration absorbability | 5 | 6 | 8 | 8 |
| Residual fatigue property of cord | — | 100 | 250 | 210 |

*1 Construction: twisting construction × filament diameter (mm)
*2 Twisting number
*3 Total sectional area of filaments constituting cord As seen from Table 2, in the motorcycle tires according to the invention, the improvement of the straight running stability and vibration absorbability is attained in addition to the improvement of the durability. And also, it has been confirmed in the feeling evaluation that the rigid feeling and the ground contact property are highly established and also the kick-back property is good in the front-wheeled tire, while the bracing and stability in the fall-down are excellent in the rear-wheeled tire.

INDUSTRIAL APPLICABILITY

According to the invention, cords having an excellent resistance to compression fatigue can be provided by reducing the high compression modulus of the steel cord, and hence the improvement of the durability in the tires used under a relatively low internal pressure typifying a passenger car tire, particularly the durability to compression deformation in a carcass ply can be advantageously attained by applying such cords to a carcass ply or the like in the tire without sacrificing the ride comfort.

Furthermore, by applying the steel cord according to the invention to a belt of a radial tire for a motorcycle can advantageously be attained the improvement of the durability, or the durability to the compression deformation of the belt without sacrificing the straight running stability and vibration absorbability. Especially, when the belt cords are arranged along the equatorial plane of the tire, if axial compression and hence bending input are applied to the belt cords in the traction and braking of the tire and the riding on protrusions, the mitigation of such an input through the angle change of the belt cord is impossible and hence the belt cords are left under severer environment. However, the belt cord according to the invention itself attains the input mitigation, so that the improvement of the durability is surely achieved.

The invention claimed is:

1. A motorcycle radial tire comprising a carcass toroidally extended between a pair at bead portions, a tread arranged on an outside at a crown portion of the carcass in a radial direction and a belt arranged between the carcass and the tread and comprised of at least one layer containing rubberized cords arranged substantially in parallel to an equatorial plane of the tire, characterized in that the cord has a single strand construction formed by twisting plural steel filaments having a tensile strength of not less than 2700 N/mm$^2$ and a total elongation at break of the cord is from 3.0% to less than 4%, said filaments all having the same helical form.

2. A motorcycle radial tire according to claim 1, wherein the cord is comprised 2 to 7 steel filaments.

3. A motorcycle radial tire according to claim 1, wherein a ratio of outer diameter of the cord to twisting pitch thereof is not less than 0.07 but not more than 0.12.

4. A motorcycle radial tire according to claim 1, wherein a diameter of the steel filament is 0.15-0.35 mm.

5. A motorcycle radial tire according to claim 1, wherein when the number of filaments constituting the cord is N and a filament diameter is d(mm), a total sectional area of the filament represented by $N\pi d^2/4$ is not more than 0.35 mm$^2$.

6. A motorcycle radial tire according to claim 1, wherein an end count of the cords in the belt is 10-60 cords/50 mm.

7. A motorcycle radial tire according to claim 1, wherein the carcass is comprised of at least one ply containing chemical fiber cords arranged at an inclination angle of 70-90° with respect to an equatorial plane of the tire.

8. A motorcycle radial tire according to claim 1, wherein a curving degree of the tread is 0.15-0.45.

9. A motorcycle radial tire according to claim 1, wherein a rubber composition coating the steel cord for the belt contains 3-7 parts by weight of sulfur and 0.2-1.5 parts by weight of cobalt based on 100 parts by weight of rubber.

10. A motorcycle radial tire according to claim 1, wherein an auxiliary rubber layer containing sulfur and cobalt in amounts by weight based on 100 parts by weight of rubber corresponding to not less than 50% of the amounts of sulfur and cobalt contained in rubber coating the steel cord for the belt, respectively, is arranged in a region adjacent to the outside and/or the inside of the belt in the radial direction.

* * * * *